United States Patent [19]

Jinkins

[11] 4,298,204
[45] Nov. 3, 1981

[54] SEAL

[75] Inventor: Danny R. Jinkins, Bel Air, Md.

[73] Assignee: Black & Decker Inc., Newark, Del.

[21] Appl. No.: 113,802

[22] Filed: Jan. 21, 1980

[51] Int. Cl.³ .............................................. F16J 15/16
[52] U.S. Cl. .................................... 277/165; 220/378; 277/171
[58] Field of Search ................ 220/378; 277/166, 165, 277/177

[56] References Cited

U.S. PATENT DOCUMENTS

| 2,764,311 | 9/1956 | Blackman | 277/167.5 |
| 3,368,818 | 2/1968 | Asamaki | 277/167.5 |
| 4,179,131 | 12/1979 | Nussbaumer | 277/165 |
| 4,254,960 | 3/1981 | Jelinek | 277/12 |

FOREIGN PATENT DOCUMENTS 2424986 11/1975 Fed. Rep. of Germany ...... 220/378

Primary Examiner—Robert I. Smith
Attorney, Agent, or Firm—Harold Weinstein; Walter Ottesen; Edward D. Murphy

[57] ABSTRACT

A seal is provided for sealing first and second mating surfaces. The seal comprises a channel in the first surface with a first projection in the bottom of the channel projecting upward towards the first surface. A second projection projects from the second surface towards the first surface and the second projection is aligned with the channel in the first surface. A gasket is positioned between the first and second surfaces at least partially within the channel, the first and second projections contacting the gasket and deforming the gasket at the points of contact thereof.

5 Claims, 8 Drawing Figures

U.S. Patent    Nov. 3, 1981    Sheet 1 of 2    4,298,204
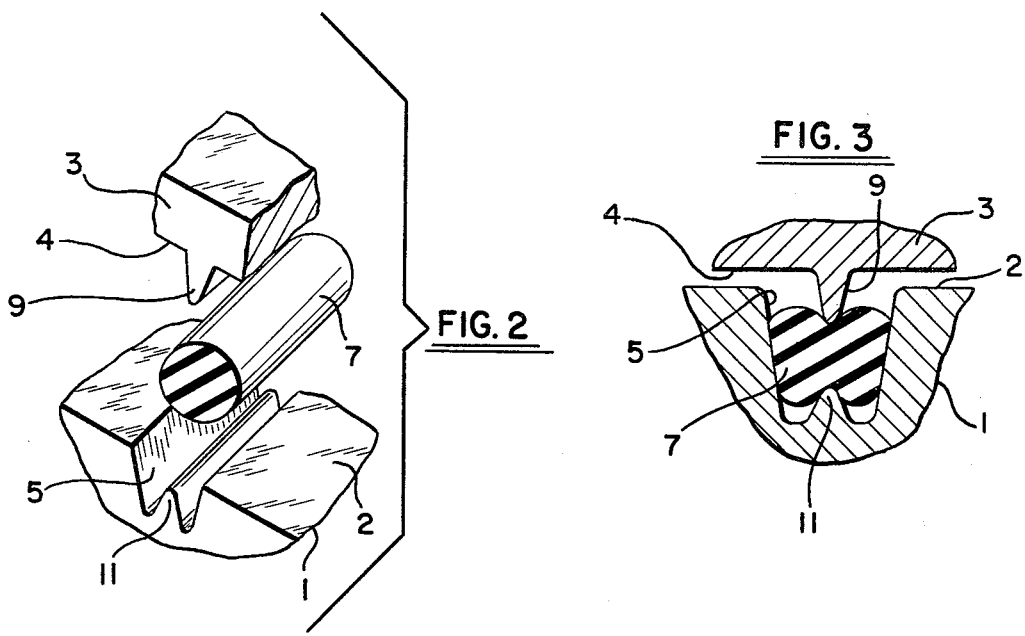
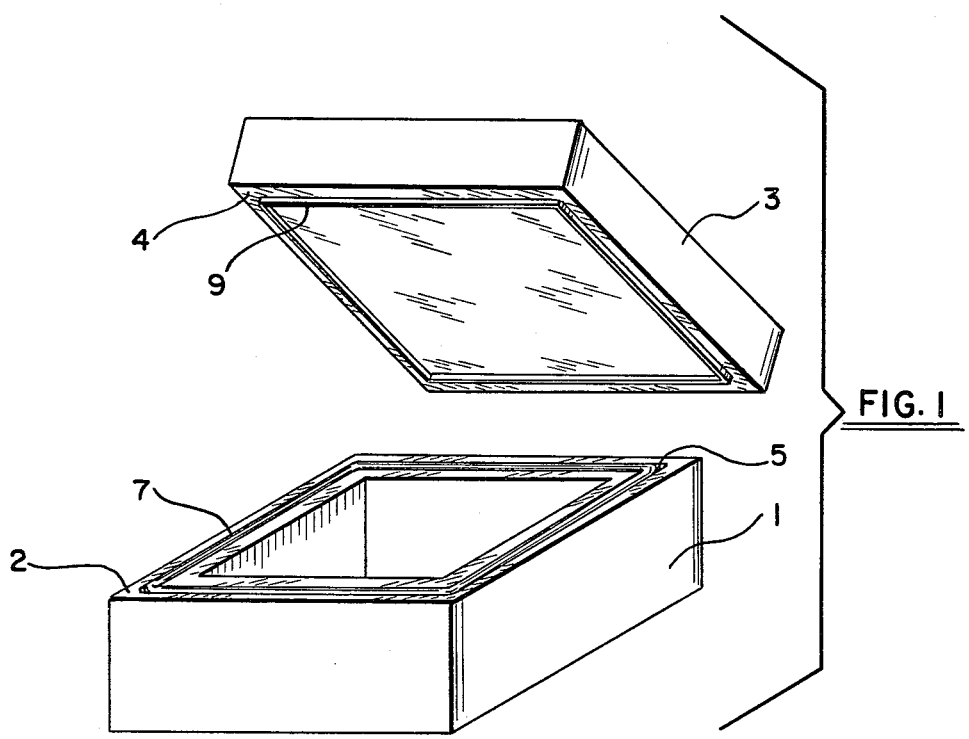

SEAL

BACKGROUND OF THE INVENTION

1. Field of the Invention

This invention is directed to a seal for sealing mating surfaces and in particular a seal which has a channel in one of the mating surfaces with a projection at the bottom thereof and a projection in the other mating surface with a sealing member in the channel which is contacted by the projection at the bottom of the channel and the projection on the other mating surface.

2. Description of the Prior Art

One prior art technique for forming a seal between two surfaces is to place a gasket between the two surfaces. In this prior art technique, tolerances must be very small in order to form an adequate seal. In addition, the force exerted by the surfaces on the seal must be great in high pressure situations because of the large surface area of the seal.

Another prior art technique for forming a seal between two mating surfaces is to form a groove or channel in one of the surfaces and to place a sealing member in the channel such that the sealing member extends above the top of the channel. The other surface is then brought into contact with the sealing member. This sealing technique is an improvement on the first technique described above, however, it also requires close tolerances. Further, the depth of the channel must be less than the thickness of the sealing member and, therefore, the top of the sealing member is exposed when the mating surfaces are separated thereby subjecting the sealing member to damage. Still further, the width of the channel must be greater than the width of the sealing member in order to allow for distortion and expansion of the sealing member when the surfaces are brought together. However, when the surfaces are separated, the sealing member can easily become dislodged from the channel because of the fact that the width of the channel is greater than the width of the sealing member.

Still another prior art technique for sealing two mating surfaces is to form a groove or channel in one of the surfaces and a projection in the other surface. When the surfaces are mated, the projection is positioned within the channel and is then crushed. This technique forms a good seal and does not require close tolerances, however, it is a destructive type of seal and if the surfaces are separated and then brought back together again, the seal has been destroyed and there is no seal between the two surfaces.

SUMMARY OF THE INVENTION

It is the primary object of the present invention to provide a seal for sealing two mating surfaces wherein the seal is formed using a relatively small force to hold the surfaces together, even in situations where there is a large pressure within the area being sealed.

It is another object of the present invention to provide a seal in which the distance between the two surfaces being sealed and the sealing member does not require close tolerances.

It is a further object of the present invention to provide a non-destructive seal.

It is still another object of the present invention to provide a seal between the mating surfaces wherein the sealing member is held in one of the sealing surfaces when the sealing surface is separated therefrom.

It is still a further object of the present invention to provide a seal in which the sealing member is positioned within a channel in one of the surfaces to be sealed such that the sealing member is positioned completely within the channel thereby reducing likelihood of damage to the sealing member when the surfaces are separated.

The present invention is directed to a seal for sealing first and second mating surfaces. The seal comprises a channel in the first surface with a first projection in the bottom of the channel. The first projection projects towards the first surface. A second projection projects from the second surface towards the first surface, the second projection being aligned with the channel in the first surface. A gasket is positioned between the first and second surfaces, in the channel in the first surface, with the first and second projections contacting the gasket and deforming the gasket at the points of contact thereof. The width of the channels is less than or equal to the width of the gasket such that when the gasket is placed in the channel it is held therein by the side walls of the channel.

BRIEF DESCRIPTION OF THE DRAWINGS

FIG. 1 is a perspective view of a housing incorporating the present invention.

FIG. 2 is a partial perspective view of a seal of the present invention.

FIG. 3 is a sectional view of a seal of the present invention.

DETAILED DESCRIPTION OF THE PREFERRED EMBODIMENTS

Figure 4A:
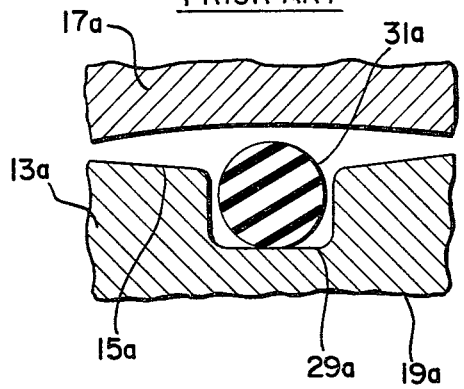
FIG. 4A is a prior art seal in a bowed-out surface.

FIG. 1 illustrates a housing incorporating the seal of the present invention. The housing comprises a base 1 and a cover 3 shown in an opened state. In the closed state, surface 2 mates with surface 4. Around the top surface 2 of the base 1 is a channel 5 which has a rope gasket 7 positioned therein. The top 3 has a projection 9 on surface 4 which extends therefrom towards the mating surface 2 and the projection 9 is aligned with the channel 5 such that when cover 3 is placed on the base 1, the projection 9 engages the gasket 7 deforming it in the manner shown in FIG. 3. A projection 11 is positioned in the bottom of channel 5 and it projects upward towards the upper surface 2 of the base 1. The projections 9 and 11 can be vertically aligned with one another as shown in FIG. 3, however, although vertical alignment is preferably, it is not necessary.

The channel 5 can be formed with sloped or tapered sides as is shown in FIG. 3. The width of channel 5 at least at its narrowest point is less than the width or diameter of gasket 7. Thus, when gasket 7 is inserted into channel 5 it will be held therein by the side walls of the channel. Thus, when cover 3 is removed, gasket 7 will remain in channel 5.

The depth of channel 5 is such that when gasket 7 is inserted therein and the bottom of gasket 7 contacts projection 11, the top of gasket 7 is below the plane of surface 2. Thus, when cover 3 is removed, the gasket 7 is protected by channel 5.

As seen in FIG. 3, projections 9 and 11 make substantially line contacts in the longitudinal direction with gasket 7. The sharper the tips of the gaskets the closer the contact is to a perfect line contact. However, in forming the tips of projections 9 and 11, care must be taken not to make the edge or tips too sharp because they could cut into the gasket 7. Because the contact between the projections and the gasket is substantially a line contact, a small force on the projections towards the gasket will result in a large pressure by the projections on the gasket. Thus, even using a small force, the seal can seal against large pressures.

Figure 5A:
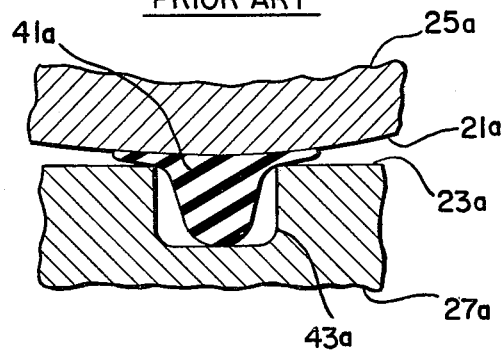
FIG. 5A is a prior art seal in a bowed-in surface.
Figure 4B:
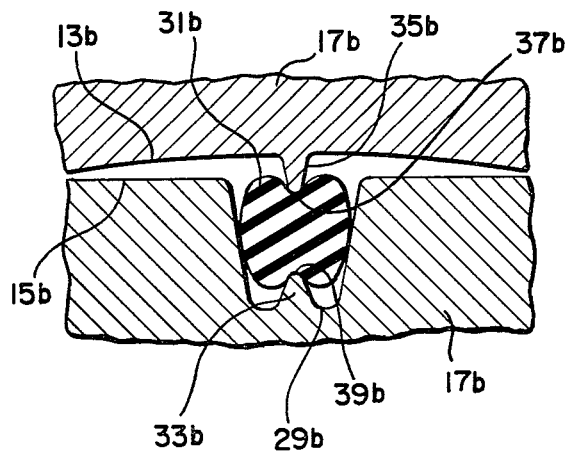
FIG. 4B is a seal of the present invention in a bowed-out surface.
Figure 5B:
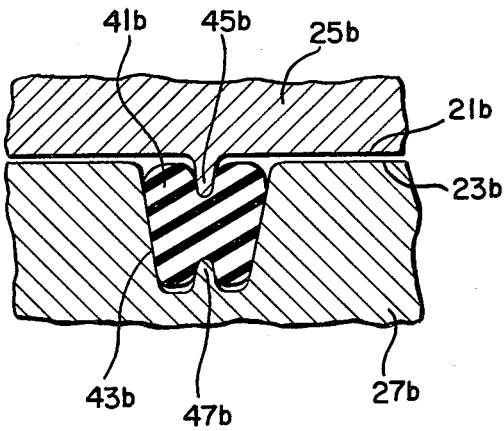
FIG. 5B is a seal of the present invention in a bowed-in surface.

Referring to FIGS. 4A, 4B, 5A and 5B, during manufacturing, the mating surfaces 13a and 15a and 13b and 15b of members 17a and 19a and 17b and 19b, respectively, and the mating surfaces 21a and 23a and 21b and 23b of members 25a and 27a and 25b and 27b, respectively are formed either bowed-out as shown in FIGS. 4A and 4B or bowed-in as shown in FIGS. 5A and 5B. In a bowed-out surface as shown in FIG. 4A, using a prior art seal having a channel 29a and a gasket 31a, the surface 13a may not contact the upper portion of the gasket 31a. Thus, no seal is formed between these two surfaces.

In FIG. 4B, channel 29b includes a projection 33b which extends upward from the bottom of the channel. Further, the surface 13b includes a projection 35b which extends downward towards channel 29b. Projections 33b and 35b engage the gasket 31b forming line seals 37b and 39b.

As can be seen in comparing FIGS. 4A and 4B, even if there is a substantial separation between surfaces 13 and 15 in the present invention, there will still be line seals formed by the surfaces and the gasket. Thus, the present invention enables the formation of the surfaces with greater tolerances than is found in the prior art.

Referring to FIGS. 5A and 5B, which illustrate a bowed-in irregularity, in the prior art of FIG. 5A, the gasket 41a is greatly deformed and extends out of the channel 43a. The deformation of the gasket 41a in the manner shown in FIG. 5A can cause substantial damage to the gasket.

In the present invention as shown in FIG. 5B, the gasket 41b is deformed by contact with projections 45b and 47b and fills the bottom of the channel 43b. The gasket 41b is not deformed in a manner such that it occupies the space between the surfaces 21b and 23b outside of the channel 43b as in the prior art.

Figure 6:
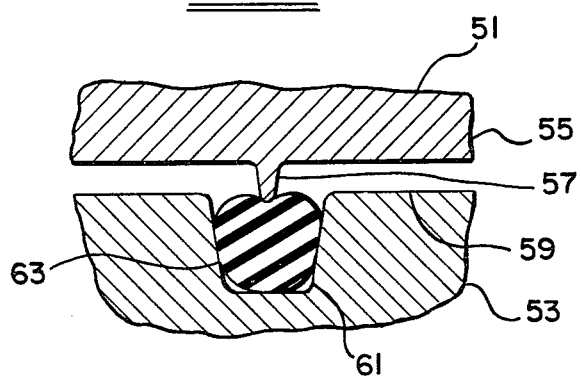
FIG. 6 is a sectional view of an alternative embodiment of the seal of the present invention.

FIG. 6 illustrates an alternative embodiment of the present invention. In the embodiment of FIG. 6, a seal is formed between upper member 51 and lower member 53. The surface 55 of upper member 51 has a projection 57 integrally formed thereon. The upper surface 59 of lower member 53 has a channel 61 formed therein. A sealing gasket 63 is positioned within the channel 61 and is contacted by projection 57. This embodiment differs from the embodiment shown in FIGS. 1-3 in that in the embodiment of FIG. 6, the channel 61 does not include a projection extending upward which engages the gasket 63.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A seal for sealing a two-member joint comprising:
   (a) a first planar surface on one of the members,
   (b) a second planar surface on the other of the members disposed adjacent to and normally spaced from the first planar surface,
   (c) a channel formed in one of the members in the planar surface thereof, the side walls of the channel being integral with the member and the surface, said side walls sloping outwardly such that the width of the base of the channel is narrower than the width of the opening of the channel,
   (d) a projection formed in alignment with and projecting within the channel on the adjacent planar surface, and
   (e) gasket means disposed in the channel and engaged by the projection to seal the joint at the first and second planar surfaces of the two respective members, wherein the width of the base of the channel is narrower than the width of the gasket means and the width of the opening of the channel is greater than the width of the gasket means.

2. The combination claimed in claim 1 wherein:
   (a) the channel formed in the first planar surface, and
   (b) the projection extending from the second planar surface.

3. The combination claimed in claim 2 wherein:
   (a) a projection formed in the channel extending in the direction of the second planar surface, and
   (b) the channel having a width greater than the distance separating the pair of projections to permit the gasket means to be solely entrapped within the channel.

4. The combination claimed in claim 2 wherein:
   (a) the channel having a base facing the second adjacent planar surface, and
   (b) the projection spaced from the base a distance less than the width of the channel to permit the gasket means to be entrapped solely within the channel to form the sealed joint between the two members.

5. The combination claimed in claim 1 wherein:
   (a) the gasket means having a cross-sectional area smaller than the cross-sectional area of the channel, and
   (b) the gasket means defines an "O" ring.

* * * * *